(12) United States Patent
Nakashima et al.

(10) Patent No.: US 7,713,312 B2
(45) Date of Patent: May 11, 2010

(54) PROCESS FOR PRODUCING ALKALI METAL HYDROGENCARBONATE

(75) Inventors: Fumiaki Nakashima, Kashima-gun (JP); Hisakazu Arima, Kashima-gun (JP); Shintaro Kikuchi, Kashima-gun (JP); Hachiro Hirano, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 969 days.

(21) Appl. No.: 11/409,050

(22) Filed: Apr. 24, 2006

(65) Prior Publication Data

US 2006/0193765 A1 Aug. 31, 2006

Related U.S. Application Data

(63) Continuation of application No. PCT/JP2004/012127, filed on Aug. 24, 2004.

(51) Int. Cl.
 *C01D 7/40* (2006.01)
(52) U.S. Cl. .................................. 23/302 T; 23/302 R
(58) Field of Classification Search ................ 23/302 T, 23/302 R; 423/422
 See application file for complete search history.

(56) References Cited

U.S. PATENT DOCUMENTS

| 5,290,322 A | * | 3/1994 | Breton et al. ............... 23/302 T |
| 5,445,805 A | | 8/1995 | Zuccarello et al. |
| 5,663,456 A | | 9/1997 | Zhang et al. |
| 6,042,622 A | * | 3/2000 | Larsen ......................... 23/300 |
| 2006/0193765 A1 | | 8/2006 | Nakashima et al. |

FOREIGN PATENT DOCUMENTS

| GB | 2 034 294 A | 6/1980 |
| JP | 55-060021 | 5/1980 |
| JP | 60-122004 | 6/1985 |
| JP | 62-247802 | 10/1987 |
| JP | 5-184805 | 7/1993 |
| JP | 05-184805 | 7/1993 |
| JP | 8-510202 | 10/1996 |
| JP | 08-510202 | 10/1996 |
| WO | 94/26664 | 11/1994 |
| WO | 01/14254 | 3/2001 |

OTHER PUBLICATIONS

U.S. Appl. No. 11/616,296, filed Dec. 27, 2006, Hirano, et al.
U.S. Appl. No. 11/619,411, filed Jan. 3, 2007, Hirano, et al.
Joachim Ulrich, "Crystallization", Kirk-Othmer Encyclopedia of Chemical Technology, XP002521007, vol. 8, Aug. 16, 2002, pp. 95-147.

* cited by examiner

*Primary Examiner*—Edward M Johnson
(74) *Attorney, Agent, or Firm*—Oblon, Spivak, McClelland, Maier & Neustadt, L.L.P.

(57) ABSTRACT

A process for producing an alkali metal hydrogencarbonate by reacting an aqueous solution containing alkali metal ions with carbon dioxide in a prescribed crystallizer to precipitate crystals of an alkali metal hydrogencarbonate, and in this process a part of a slurry containing the alkali metal hydrogencarbonate crystals in the aqueous solution is withdrawn from the crystallizer and, after dissolution of a part of the crystals, it is returned to the crystallizer.

12 Claims, 1 Drawing Sheet

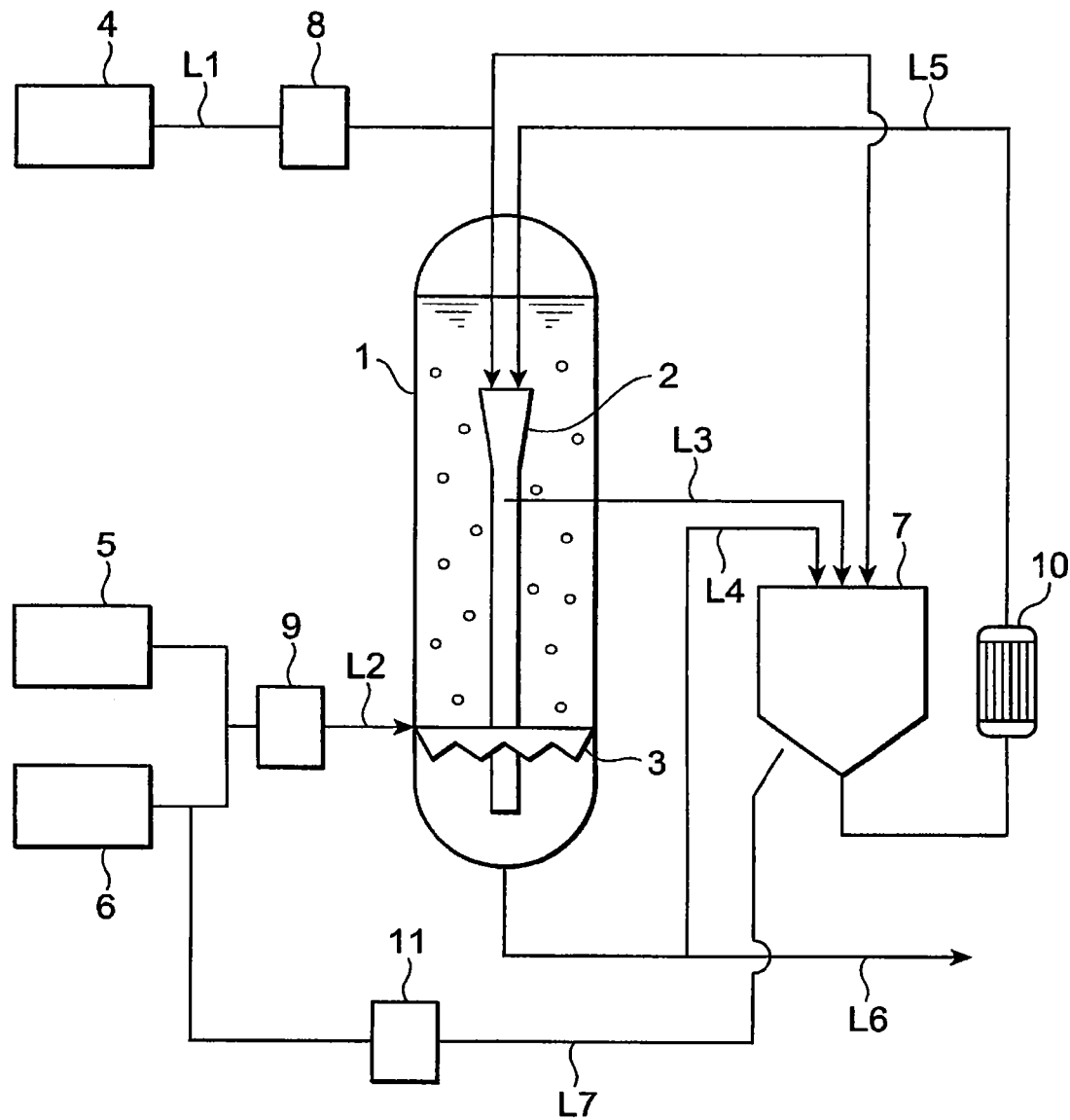

PROCESS FOR PRODUCING ALKALI METAL HYDROGENCARBONATE

TECHNICAL FIELD

The present invention relates to a process for producing an alkali metal hydrogencarbonate.

BACKGROUND ART

An alkali metal hydrogencarbonate such as sodium hydrogencarbonate is produced by crystallization from an aqueous solution. For example, carbon dioxide is blown into an aqueous solution containing sodium ions to obtain sodium hydrogencarbonate crystals formed by a reaction. As the solution containing sodium ions, an aqueous solution containing sodium carbonate or sodium hydroxide, or so-called ammonia brine obtained by blowing ammonia into a sodium chloride solution, is employed.

For example, sodium hydrogencarbonate is usually difficult to grow to large particles and tends to have a small average particle size, since nuclei tend to be formed in a large amount during crystallization, whereby the proportion of fine particulate crystals will increase, and the total number of crystals will increase. Formation of nuclei is likely to be remarkable if it is attempted to obtain large particles and is considered to be caused by peeling of seed crystals from the surface of crystals by a rapid flow of the mother liquor at the surface of the particles.

And, if such fine particulate or small crystals increase, it is likely that the yield of large crystals will decrease, and further the subsequent operation such as separation, washing, drying or classification of the solid tends to be difficult. Further, large size crystals are desired, for example, in an application where flowability as a powder product is required, and it is an object for a crystallization process how to obtain large crystals.

In a conventional crystallization process, in order to increase the size of crystals to be precipitated, a method of using a crystal habit modifier has been, for example, employed. However, if a crystal habit modifier is used, the crystal habit is likely to be changed, whereby the crystal state may be changed, and since the effects will be obtained under specific conditions, it has been difficult to use such a method in combination with other methods. Further, the crystal habit modifier may remain in crystals thereby to lower the purity of the crystals, whereby the application of the product tends to be limited.

Further, a method is also known wherein the crystallization load i.e. the amount of crystals formed per unit time and unit volume is substantially reduced to lower the super saturation degree of the crystal component precipitated in the mother liquor thereby to minimize formation of nuclei. However, in this method, the crystallization load per unit time and unit volume of the crystallization equipment is required to be low, whereby the productivity of the equipment used to be low in many cases.

Further, in order to lower the super saturation degree of the crystal component precipitated in the mother liquor, there is a method of adding a third component (such as sodium chloride or ethyl alcohol) to lower the solubility of the alkali metal hydrogencarbonate. However, for its separation from the mother liquor, a cake is required to be sufficiently washed, and the above third component may still remain in the crystals. Further, in a case where sodium chloride is to be added, there will be a limitation to the material for the equipment to prevent corrosion, and in a case where an inflammable organic solvent such as ethanol is to be added, an operational limitation will be involved taking the inflammability into consideration, whereby the operation tends to be complex.

Further, the particle size of crystals may be made large also by a method of removing formed fine particulate crystals out of the system. However, if this method is carried out as a continuous operation, it will be difficult from the viewpoint of the equipment to selectively remove fine particles in such a large amount sufficient to increase the crystal size, whereby there is a problem such that it is difficult to carry out treatment of fine particulate crystals sufficiently. Further, an equipment to treat removed fine particles will be required, and the yield tends to be low. Thus, it was not possible to industrially produce large crystals in good yield solely by this method.

Further, a process for producing an alkali metal hydrogencarbonate is disclosed which comprises reacting an aqueous solution containing alkali metal ions with carbon dioxide to precipitate crystals, wherein an operation to dissolve and remove fine particles of an alkali metal hydrogencarbonate by bringing the concentration of the alkali metal hydrogencarbonate dissolved in a liquid to a level of at most the saturation solubility with respect to the entire crystallization liquid in the crystallization equipment, is intermittently repeated (Patent Document 1). However, blowing of carbon dioxide gas is required to be intermittently switched to air, whereby the operation efficiency is poor and an investment is required to control the equipment.

Patent Document 1: WO01/14254 (Claims)

DISCLOSURE OF THE INVENTION

Object to be Accomplished by the Invention

It is an object of the present invention to overcome the above-mentioned problems and to provide a process for easily obtaining an alkali metal hydrogencarbonate having a large crystal particle size in good yield by an industrially convenient equipment by a crystallization method from an aqueous solution.

Means to Accomplish the Object

The present invention provides a process for producing an alkali metal hydrogencarbonate, which comprises reacting an aqueous solution containing alkali metal ions with carbon dioxide in a prescribed crystallizer to precipitate crystals of an alkali metal hydrogencarbonate, characterized in that a part of a slurry containing the above crystals in the above aqueous solution, is withdrawn from the above crystallizer and, after a part of the above crystals is dissolved, returned to the above crystallizer.

In order to accomplish the above object, the process for producing an alkali metal hydrogencarbonate of the present invention is characterized in that in the process of reacting an aqueous solution containing alkali metal ions with carbon dioxide in a prescribed crystallizer comprising a crystallizer and a dissolution apparatus to precipitate crystals of an alkali metal hydrogencarbonate, a part of a slurry comprising the aqueous solution and the crystals is withdrawn from the crystallizer and, after a part of the crystals is dissolved, returned to the crystallizer.

In the present invention, a part of the slurry comprising the aqueous solution and the crystals is withdrawn from the crystallizer and, after a part of the crystals contained in the slurry is dissolved, returned to the crystallizer. With respect to dissolution of the crystals within the dissolution apparatus, smaller crystals will be quickly dissolved and disappear, and consequently, a slurry having fine crystals including crystal nuclei removed, will be returned to the crystallizer.

Further, in the present invention, as a means to let large crystals of the alkali metal hydrogencarbonate further grow, a method is provided wherein large crystals are once dissolved to some extent, and the crystals are again grown further by recrystallization. Thus, large crystals are partially dissolved and returned to the crystallizer in the form of crystals which can readily be grown again. When large crystals are dissolved a little, only the tip end portions of the crystals in a longitudinal direction being a crystal growth direction will be dissolved a little. Such portions are the growth faces of the crystals. By the renewal of such growth faces of the crystals, the crystals will be made to be grown further. With an alkali metal hydrogencarbonate, even if the operation for removal of fine particles is reinforced, it becomes impossible to let crystals further grow solely by such an operation, because large crystals themselves tend to become not growing anymore. In the present invention, as a measure to solve this problem, the crystals are dissolved a little to make them grow afresh. The dissolution may be a little, since it is simply to renew the growth faces of the crystals.

Accordingly, by the present invention, even in a continuous operation, the same effect can be obtained as in the case of selectively removing fine particulate crystals out of the system; the apparent number of nuclei formed can be substantially reduced; and it is possible to further promote the growth of larger crystals, whereby it becomes possible to industrially obtain an alkali metal hydrogencarbonate having a large crystal particle size with high efficiency.

EFFECTS OF THE INVENTION

According to the present invention, in the crystallization method from an aqueous solution, it is possible to easily and certainly control the apparent number of nuclei formed in an industrial scale, whereby an industrial production of an alkali metal hydrogencarbonate excellent in the flowability as a powder having a large particle size, becomes possible. For example, in the case of sodium hydrogencarbonate, it is possible by the present invention to easily obtain crystals having an average particle size of at least 150 μm.

BRIEF DESCRIPTION OF THE DRAWING

The FIGURE is a schematic view showing one embodiment of a reaction apparatus comprising a crystallizer and a dissolution apparatus, which is preferably used in the present invention.

MEANINGS OF SYMBOLS

1: Crystallizer, 2: inner cylinder, 3: gas inlet, 4: raw material solution tank, 5: carbon dioxide supply apparatus, 6: air supply apparatus, 7: dissolution apparatus, 8: membrane filter, 9: membrane filter, 10: heat exchanger, 11: membrane filter, L1: raw material solution supply line, L2: carbon dioxide blowing line, L3: slurry withdrawing line, L4: slurry withdrawing line, L5: slurry recycling line, L6: slurry withdrawing line, and L7: air blowing line

BEST MODE FOR CARRYING OUT THE INVENTION

Now, a preferred embodiment of the present invention will be described in detail with reference to the drawing as the case requires.

In the present invention, the alkali metal constituting the alkali metal hydrogencarbonate is not particularly limited. In the following embodiment, a case wherein the alkali metal is sodium, will be described, but the present invention may be applied similarly to a case of another alkali metal. As such another alkali metal, potassium is preferred.

FIG. 1 is a flow chart showing an embodiment of a crystallizing facility which is preferably used in the present invention. In FIG. 1, a crystallizer 1 as a reactor is internally equipped with an inner cylinder 2. The top of the inner cylinder 2 is connected to a raw material solution tank 4 via a raw material solution supply line L1, and an aqueous sodium carbonate solution in the raw material solution tank 4 is supplied into the inner cylinder 2 via precision filtration by a membrane filter 8. Or, it is supplied into a dissolution apparatus 7 which will be described hereinafter.

This aqueous sodium carbonate solution can be prepared by preliminarily reacting a sodium hydroxide solution with carbon dioxide or by further adding pure water to adjust the concentration and composition. Here, instead of the aqueous sodium carbonate solution, an aqueous sodium hydroxide solution may be used directly, or an aqueous solution containing both sodium carbonate and sodium hydroxide may be employed. Further, an aqueous solution containing both sodium carbonate and sodium hydrogencarbonate, may be used. To a gas inlet portion 3 provided at a lower portion of the crystallizer 1, a carbon dioxide supply apparatus 5 and an air supply apparatus 6 are connected via a carbon dioxide supply line L2, and carbon dioxide and air are mixed in a prescribed ratio. Such a mixed gas is supplied into the crystallizer 1 from the gas inlet portion 3 via precision filtration by a membrane filter 9. It is thereby possible to react an aqueous sodium carbonate solution with carbon dioxide to precipitate sodium hydrogencarbonate crystals. At that time, it is preferred adjust the temperature within the crystallizer 1 to be from 50 to 90° C., whereby crystallization can be carried out efficiently and constantly.

To the interior of the inner cylinder 2, a slurry withdrawing line L3 is connected, and at its forward position, a dissolution apparatus 7 is provided so that the internal pressure can be adjusted. A part of the slurry comprising the aqueous sodium carbonate solution and sodium hydrogencarbonate crystals, is taken out from the interior of the inner cylinder 2 to the dissolution apparatus 7 via the slurry withdrawing line L3. And, by adjusting the pressure within the dissolution apparatus 7 to be lower than the pressure within the crystallizer 1, a part of the sodium hydrogencarbonate crystals in the slurry withdrawn, will be dissolved in the aqueous sodium carbonate solution. The slurry having such fine particle-dissolution treatment applied, will be returned again into the crystallizer 1 via a slurry recycling line L5.

Further, instead of the slurry withdrawing line L3, another slurry withdrawing line L4 connected to a lower portion of the crystallizer 1 may be used. In the case of the slurry withdrawing line L3, the slurry is withdrawn from the inner cylinder 2, whereby large crystals are little, because crystals entering into the inner cylinder 2 will have to rise to the vicinity of the uppermost portion of the liquid level in the crystallizer, but larger crystals tend to remain at a lower portion of the crystallizer and tend to scarcely enter into the inner cylinder 2. By using the slurry withdrawing line L4 instead of the slurry withdrawing line L3, larger crystals can be withdrawn into the dissolution apparatus 7. It is thereby possible that a part of the larger crystals will be dissolved, and such crystals can be further grown to be large. And, they are returned again to the crystallizer, and such crystals will be further grown to be large.

Here, the amount of the slurry withdrawn from the crystallizer 1 into the dissolution apparatus 7 is preferably from 30 to 200 mass % per hour, based on the total amount of the slurry in the crystallizing facility shown in FIG. 1.

Further, the pressure in the dissolution apparatus 7 in the fine particle dissolution treatment, is not particularly limited so long as it is lower than the pressure in the crystallizer 1, but the pressure difference between the two is preferably within a range of from 0.01 to 1.0 MPa, more preferably from 0.1 to 0.5 MPa. Such a pressure difference may, for example, be accomplished by withdrawing the slurry from the crystallizer 1 operated under elevated pressure thereby to return the interior of the dissolution apparatus 7 to the atmospheric pressure. Here, in the dissolution apparatus 7, carbon dioxide gas will be formed. This carbon dioxide gas may be recycled to a supply source of carbon dioxide, then pressurized by a carbon dioxide supply apparatus 5 and blown into the crystallizer 1.

The slurry containing sodium hydrogencarbonate crystals thus precipitated, is withdrawn from a slurry withdrawing line L6 connected to the lower portion of the crystallizer 1, and from the slurry, sodium hydrogencarbonate crystals are separated and dried in a carbon dioxide gas atmosphere, whereby large and thick sodium hydrogencarbonate crystals can be obtained. The sodium hydrogencarbonate crystals thus obtainable are usually ones having a large aspect ratio (the value obtained by dividing the length of the long axis of a crystal by the length of the short axis thereof), but by roughly pulverizing them to cut them perpendicularly to their axial direction, they may be made to be a powder which is more cubic, large, low in bulk density and excellent in flowability. Further, sodium hydrogencarbonate is dissolved in water from the long axis direction, and accordingly, by the above-described rough pulverization, the speed for dissolution in water can be increased.

Further, instead of the rough pulverization after drying the sodium hydrogencarbonate, the particles in the slurry in the crystallizer 1 or in the dissolution apparatus 7 may be pulverized to obtain crystals having a small aspect ratio. Usually, if particles in a sodium hydrogencarbonate slurry in a crystallizer 1 are roughly pulverized while crystallizing them, crystal nuclei will be formed excessively, and sodium hydrogencarbonate crystals in the crystallizer 1 will rapidly be microsized. However, in the present invention, formed fine particles can easily and certainly be dissolved and removed by the above-described fine particle dissolution treatment, and even if particles in the slurry in the crystallizer 1 or in the dissolution apparatus 7 are pulverized, it is possible to obtain crystals having an aspect ratio similar to those roughly pulverized after the drying. Further, the crystals thus obtainable will undergo crystal growth also after the rough pulverization, so that they may be rounded to some extent and become ones having a higher flowability as a powder.

As a method suitable for pulverizing the particles in the sodium hydrogencarbonate slurry, a method may, for example, be mentioned wherein the slurry containing the crystals is withdrawn from the dissolution apparatus 7 via a piping and introduced into a pulverizer installed outside, and after the pulverization by the pulverizer, it is returned to the crystallizer 1 or to the dissolution apparatus 7. Further, at the time of such pulverization, the particles may be pulverized, for example, by permitting the particles to collide with impellers by means of a pump. However, it is not preferable to apply an excessively strong external force to the particles, since the particles may be pulverized more finely than desired.

It is preferred that the composition of the mother liquor of the above slurry withdrawn from the above crystallizer, is such that the alkali metal hydrogencarbonate is at a concentration of less than the saturated concentration. With respect to a slurry to be pulverized, the composition of the mother liquor of the slurry can be made to have a saturated concentration by withdrawing from the dissolution apparatus 7. Usually, since crystal nuclei will be formed by a shearing force generated during the pulverization, not only the crystals will be bent to be short, but also, the crystals within the crystallizer 1 will be microsized. Here, in the case of the slurry in the dissolution apparatus 7, the composition of the mother liquor becomes less than the saturated concentration of the alkali metal hydrogencarbonate, whereby even if crystal nuclei will be formed, they will immediately disappear, such being desirable.

Thus, in this embodiment, a part of the slurry is withdrawn from the crystallizer 1 into the dissolution apparatus 7, and the pressure of the dissolution apparatus 7 is adjusted to be lower than the pressure of the crystallizer 1, whereby the concentration of sodium hydrogencarbonate dissolved in the withdrawn slurry will be temporarily lower than the saturated concentration. At that time, in the slurry, sodium hydrogencarbonate crystals having various particle sizes are present, and all particles start to dissolve, but particles having small particle sizes will be more quickly and completely dissolved and disappear than particles having large particle sizes. Accordingly, larger crystals will selectively remain, and the total number of crystals will decrease, whereby the apparent number of nuclei formed will substantially decrease, and even in a continuous operation as described above, the same effect as in the case of removing fine particulate crystals out of the system can be obtained, whereby sodium hydrogencarbonate crystals having a large particle size can be obtained certainly in good yield.

Further, by properly adjusting the conditions (the pressure, temperature, etc.) in such fine particle dissolution treatment, fine particulate crystals can be selectively dissolved in the slurry, whereby the particle size of precipitated crystals can easily and certainly be controlled. Further, by withdrawing larger crystals into the dissolution apparatus 7, whereby a part of the larger crystals will be dissolved, and such crystals can be made to further grow to be larger. And, such crystals are returned again to the crystallizer and further grown to be larger. Thus, the particle size of the precipitated crystals can further be made larger.

Further, the present invention is not limited to the above-described embodiment. For example, at the time of the fine particle dissolution treatment, in the dissolution apparatus 7, air in a volume of from 0.2 to 20 times the flow rate of the slurry in a standard state may be blown into the slurry by means of the air blowing line L7 to dissolve a part of sodium carbonate crystals contained in the slurry, in the sodium carbonate aqueous solution.

Thus, carbon dioxide dissolved in the slurry will be released into the air, and consequently, the concentration of the sodium hydrogencarbonate in the slurry decreases to a level of less than the saturated concentration, whereby crystal nuclei of sodium hydrogencarbonate, fine particles of sodium hydrogencarbonate and the forward end portions of the sodium hydrogencarbonate crystals will be dissolved, and the apparent number of nuclei formed can sufficiently be reduced. Here, the gas blown into the dissolution apparatus may be nitrogen gas instead of the air, and carbon dioxide may also be mixed to finely adjust the dissolution conditions.

Otherwise, in the dissolution apparatus 7, sodium hydroxide may be added to the slurry to dissolve a part of sodium hydrogencarbonate crystals contained in the slurry, in the aqueous sodium carbonate solution. Namely, by a reaction of sodium hydroxide and sodium hydrogencarbonate, decomposition of the sodium hydrogencarbonate takes place, and consequently, the sodium hydrogencarbonate concentration in the slurry decreases to a level of less than the saturated concentration, whereby the apparent number of nuclei can be reduced in the same manner as described above. Further, sodium hydroxide may be added as it is, but it is preferred to add it in the form of an aqueous sodium hydroxide solution (concentration: preferably from 20 to 48 mass %). The amount is preferably from 0.05 to 30 kg/hr as calculated as anhydrous sodium hydroxide relative to 100 kg/hr of the slurry. If the amount is less than 0.05 kg/hr, the effect for dissolution of fine particles is small, and if the amount exceeds 30 kg/hr, water taken into the system will increase, and the liquid balance will not be taken (the amount of liquid increases too much, and purging is required) and unit consumption deteriorates, such being undesirable.

The purpose for the addition of an aqueous sodium hydroxide solution to the dissolution tank 7 is to dissolve sodium hydrogencarbonate. Accordingly, an unsaturated sodium carbonate aqueous solution may be added. The concentration is preferably at most 30 mass % as $Na_2CO_3$, and the amount to be added is preferably from 10 to 40 kg/hr as calculated as anhydrous sodium carbonate relative to 100 kg/hr of the slurry. Further, the solution to be added may be an aqueous solution having sodium hydroxide and sodium carbonate mixed. Further, such a solution may be one which dissolves sodium hydrogencarbonate and thus may be a raw material solution to be supplied from the raw material solution tank 4.

Further, in the dissolution apparatus 7, water may be added to the slurry to dissolve a part of sodium hydrogencarbonate crystals contained in the slurry in the sodium carbonate solution. The concentration of sodium hydrogencarbonate in the slurry is thereby lowered to a level of less than the saturated concentration, and the apparent number of nuclei formed can be substantially reduced in the same manner as described above. At that time, the amount of water to be added is preferably from 0.1 to 50 kg/hr relative to 100 kg/hr of the slurry.

Further, in the dissolution apparatus 7, water may be added to the slurry to dissolve a part of sodium hydrogencarbonate crystals contained in the slurry. By the addition of water, the concentration of sodium hydrogencarbonate in the slurry will be lowered, and the apparent number of nuclei formed can be substantially reduced in the same manner as described above. At that time, the amount of water to be added is preferably from 5 to 50 kg/hr relative to 100 kg/hr of the slurry.

Further, in the dissolution apparatus 7, the slurry may be heated to dissolve a part of sodium hydrogencarbonate crystals contained in the slurry. The concentration of sodium hydrogencarbonate in the slurry will thereby be lowered to a level of less than the saturated concentration, whereby the apparent number of nuclei formed can be substantially reduced in the same manner as described above. Such a heating temperature is preferably from 0.2 to 10° C.

One of the above-mentioned method for dissolving the fine particles may be carried out alone, or two or more of them may be carried out in combination. For example, in the slurry withdrawing line L4 and the slurry recycling line L5 in FIG. 1, a heat exchanger 10 is installed on the downstream side of the dissolution apparatus 7, and in the dissolution apparatus 7, the slurry under a pressure lower than the pressure in the crystallizer 1 is further heated, to increase the efficiency of the dissolution treatment of the fine particles, etc.

Further, in the above embodiment, a case is shown wherein a crystallization facility provided with an inner cylinder type crystallizer of a continuously completely mixing tank system. However, the process of the present invention is effective for various crystallization operations to precipitate crystals by a reaction of a solution containing alkali metal ions with carbon dioxide, such as a continuous system crystallization operation, a batch system crystallization operation, a completely mixing tank system crystallization operation or a piston flow system crystallization operation. For example, the process of the present invention can be carried out suitably also in a case where a piston flow type crystallizing equipment is used wherein a solution containing alkali metal ions and carbon dioxide are counter currently contacted, or in a case where a crystallizing equipment of cooling type such as air cooling is employed.

The process of the present invention may be used in combination with an operation for removal or prevention of formation of fine particles which has heretofore been employed, such as a method of using a crystal habit modifier or addition of a third component to lower the solubility of an alkali metal hydrogencarbornate, and further, a plurality of such operations may be used in combination.

EXAMPLES

Now, the present invention will be described in further detail with reference to Examples and Comparative Examples. However, it should be understood that the present invention is by no means restricted by the following Examples. Here, Examples 1 and 3 to 8 are Examples of the present invention, and Example 2 is a Comparative Example.

Crystallizing Facility

In the following Examples, except that the fine particle dissolution means of the dissolution apparatus 7 is different, the reaction apparatus having the construction shown in FIG. 1 was used, and a crystallization test of sodium hydrogencarbonate was carried out continuously to confirm the effects of the present invention.

As the crystallizer 1, a crystallizing tower having an inner diameter of 0.4 m and a total height of 16.05 m and equipped with an inner cylinder 2 having an inner diameter of 0.1 m and a height of 11.31 m, was used.

As the raw material solution to be supplied to the crystallizer 1, an aqueous sodium carbonate solution was used which was prepared by preliminarily reacting carbon dioxide to an aqueous solution of sodium hydroxide obtained by an ion exchange membrane method and further adding pure water, followed by concentration and adjustment of the composition. This aqueous sodium hydrogencarbonate solution was subjected to precision filtration by a membrane filter 8 having apertures of 0.1 μm and then continuously supplied in a predetermined amount to the crystallizer 1 via the raw material solution supply line L1. The concentration of the raw material solution to be supplied was obtained by an acid-alkali neutralization titration by a Winkler method.

Carbon dioxide to be used for crystallization was mixed with air and after being pressurized by a compressor provided in a carbon dioxide supply apparatus 5, subjected to precision filtration by a membrane filter 9 having apertures of 0.1 μm, and then supplied in a predetermined amount to the crystallizer 1 via the carbon dioxide blowing line L2.

For the measurement of the average particle size of crystals in the crystallizer 1, the mixed slurry comprising the crystals and the solution i.e. the mother liquid (the solution portion of the slurry excluding crystals) in the crystallizer 1 was centrifugally separated, followed by drying in a from 40 to 43% carbon dioxide gas at 50° C. in a box type dryer, whereupon the average particle size was evaluated by mass standard by means of a low tap shaking tester and JIS standard sieves.

Namely, standard sieves having a diameter of 20 cm and apertures of 355 μm, 250 μm, 180 μm, 150 μm, 106 μm, 75 μm and 45 μm, respectively, were stacked on a tray in the order of smaller apertures, and 100 g of a sample was put in the top sieve, covered with a lid and then mounted on a sieving machine (a low tap shaking tester) capable of imparting tap shaking and rotation simultaneously, followed by sieving for 30 minutes. The mass of the sample remaining on each sieve and the mass of the sample received on the tray were measured to obtain a cumulative plus sieve particle size distribution, which was plotted on a lognormal distribution paper, whereupon from the 50% value, the average particle size was obtained.

Example 1

To the crystallizer 1, the raw material solution was supplied constantly at a rate of 100 kg/hr by the raw material solution supply line L1, and at the same time, a mixed gas of carbon dioxide at a concentration of from 40 to 43%/air was continuously supplied by the carbon dioxide blowing line L2 at a flow rate of 30 m$^3$/hr (standard state).

Further, from the inner cylinder 2 in the crystallizer 1, the slurry was withdrawn at a rate of 800 kg/hr by the slurry withdrawing line L3 into the dissolution apparatus 7 (inner diameter: 0.4 m, height: 3.1 m) and returned to the atmospheric pressure. Further, this liquid was returned to the inlet (upper side) of the inner cylinder 2 via the heat exchanger 10 (temperature: 67° C.) by the slurry recycling line L5. The amount of the slurry withdrawn from the crystallizer 1 by the slurry withdrawing line L6, was adjusted depending upon the amount of the raw material solution supplied to maintain the liquid level in the crystallizer 1 to be constant. The crystallization temperature in the crystallizer 1 was maintained to be 65° C. by indirect heating by steam from the heat exchanger 10.

The compositions of the raw material solution supplied, the mother liquor in the crystallizer 1 and the mother liquor in the dissolution apparatus 7, as well as the average particle size of sodium hydrogencarbonate crystals in the crystallizer 1 and the apparent number of nuclei formed, from the first day to the fifth day after initiation of the crystallization test, are shown in Table 1. Here, the numerical values for the composition in the crystallizer are different from the real values in the crystallizer, because at the time when slurry is sampled from the crystallizer, the pressure which has been exerted to the slurry as a sample, is released, and is the pressure decreases to a level of the atmospheric pressure, and the slurry will be in the same state as withdrawn into the dissolution apparatus. Specifically, the concentration of NaHCO$_3$ decreases, and the concentration of Na$_2$CO$_3$ increases. It is evident that in Example 1, by the fine particle dissolution treatment, the apparent number of nuclei formed was substantially reduced, and the average particle size of the precipitated crystals became large.

TABLE 1

| Number of days passed | Composition of the solution (mass %) | | | | | | Average particle size (μm) | Apparent number of nuclei formed (number) |
|---|---|---|---|---|---|---|---|---|
| | Raw material solution | | Mother liquor in the crystallizer | | Mother liquor in the dissolution apparatus | | | |
| | Na$_2$CO$_3$ | NaHCO$_3$ | Na$_2$CO$_3$ | NaHCO$_3$ | Na$_2$CO$_3$ | NaHCO$_3$ | | |
| 1 | 19.5 | 2.6 | 4.5 | 11.1 | 4.6 | 11.1 | 92 | 7.9 × 10$^{12}$ |
| 2 | 20.6 | 2.0 | 4.1 | 12.1 | 4.2 | 12.0 | 128 | 5.6 × 10$^{12}$ |
| 3 | 20.0 | 2.2 | 4.5 | 11.7 | 4.6 | 11.1 | 103 | 6.7 × 10$^{12}$ |
| 4 | 20.2 | 2.2 | 4.3 | 11.5 | 4.4 | 11.1 | 115 | 2.0 × 10$^{12}$ |
| 5 | 20.0 | 2.1 | 4.2 | 11.3 | 4.3 | 11.3 | 120 | 8.8 × 10$^{11}$ |

Example 2

Comparative Example

Crystallization was carried out under the same conditions as in Example 1 except that the withdrawal of the slurry from the inner cylinder 2 in the crystallizer 1 by the slurry withdrawing line L3 in Example 1 was stopped. The flow rate of the raw material solution supplied was 100 kg/hr, the flow rate of carbon dioxide supplied was 30 m$^3$/hr (standard state). The analysis was carried out in the same manner as in Example 1, and the results are shown in Table 2. In Example 2, even after completion of crystallization on the first day after initiation of the crystallization test, the crystals stayed to be microsized at a level of about 50 μm. Accordingly, the test was terminated at that point in time.

TABLE 2

| Number of days passed | Composition of the solution (mass %) | | | | Average particle size (μm) | Apparent number of nuclei formed (number) |
|---|---|---|---|---|---|---|
| | Raw material solution | | Mother liquor in the crystallizer | | | |
| | Na$_2$CO$_3$ | NaHCO$_3$ | Na$_2$CO$_3$ | NaHCO$_3$ | | |
| 1 | 20.2 | 2.1 | 4.7 | 11.2 | 51 | 3.5 × 10$^{13}$ |

Example 3

Into the crystallizer 1, the raw material solution was supplied constantly at a rate of 200 kg/hr by the raw material solution supply line L1, and at the same time, a mixed gas of carbon dioxide at a concentration of from 40 to 43%/air was continuously supplied by the carbon dioxide blowing line L2 at a flow rate of 54 m$^3$/hr (standard state).

Further, from the inner cylinder 2 in the crystallizer 1, the slurry was withdrawn at a rate of 1,200 kg/hr by the slurry withdrawing line L3 into the dissolution apparatus 7 and returned to the atmospheric pressure. Further, air was passed through the membrane filter 11 of 0.1 μm and then blown at a rate of 120 liter/hr (standard state) from the air blowing line L7, and then, this liquid was returned to the inlet (the upper side) of the inner cylinder 2 via the heat exchanger 10 (temperature: 82° C.) by the slurry recycling line L5. The amount of the slurry withdrawn from the crystallizer 1 by the slurry withdrawing line L6 was adjusted depending upon the amount of the raw material solution supplied to maintain the liquid level in the crystallizer 1 to be constant. The crystallization temperature in the crystallizer 1 was maintained to be 80° C. by indirect heating by steam from the heat exchanger 10.

The compositions of the raw material solution supplied and the mother liquor in the dissolution apparatus 7, as well as the average particle size of sodium hydrogencarbonate crystals in the crystallizer 1 and the apparent number of nuclei formed, from the first day to the fifth day after initiation of the crystallizing test, are shown in Table 3.

TABLE 3

| Number of days passed | Composition of the solution (mass %) | | | | Average particle size (μm) | Apparent number of nuclei formed (number) |
|---|---|---|---|---|---|---|
| | Raw material solution | | Mother liquor in the dissolution apparatus | | | |
| | $Na_2CO_3$ | $NaHCO_3$ | $Na_2CO_3$ | $NaHCO_3$ | | |
| 1 | 20.2 | 2.6 | 7.3 | 11.8 | 190 | $7.2 \times 10^{10}$ |
| 2 | 21.3 | 2.0 | 7.0 | 11.8 | 201 | $1.0 \times 10^{10}$ |
| 3 | 20.8 | 2.2 | 7.4 | 11.5 | 220 | $2.1 \times 10^{10}$ |
| 4 | 20.9 | 2.2 | 7.3 | 12.8 | 212 | $9.2 \times 10^{9}$ |
| 5 | 20.8 | 2.1 | 7.3 | 12.3 | 208 | $8.5 \times 10^{9}$ | obtained by an ion exchange membrane method to a concentration of 48%, followed by precision filtration by a membrane filter having apertures of 0.1 μm. Here, the reason for lowering the concentration of the raw material solution is to adjust the crystallization load per unit solution in the crystallizer 1 to match Example 1. Namely, the addition of sodium hydroxide to the dissolution apparatus 7 and the increase of the concentration of the mother liquor were taken into consideration.

Further, the amount of the slurry withdrawn from the crystallizer 1 by the slurry withdrawing line L6 was adjusted depending upon the amount of the raw material solution supplied to maintain the liquid level in the crystallizer 1 to be constant. The crystallization temperature in the crystallizer 1 was maintained to be 65° C. by indirect heating by steam from the heat exchanger 10.

The compositions of the raw material solution supplied, the mother liquor in the crystallizer 1 and the mother liquor in the dissolution apparatus 7, as well as the average particle size of sodium hydrogencarbonate crystals in the crystallizer 1 and the apparent number of nuclei formed, from the first day to the fifth day after initiation of the crystallizing test, are shown in Table 4.

TABLE 4

| Number of days passed | Composition of the solution (mass %) | | | | | | Average particle size (μm) | Apparent number of nuclei formed (number) |
|---|---|---|---|---|---|---|---|---|
| | Raw material solution | | Mother liquor in the crystallizer | | Mother liquor in the dissolution apparatus | | | |
| | $Na_2CO_3$ | $NaHCO_3$ | $Na_2CO_3$ | $NaHCO_3$ | $Na_2CO_3$ | $NaHCO_3$ | | |
| 1 | 10.7 | 1.7 | 5.2 | 6.7 | 11.7 | 1.6 | 145 | $2.9 \times 10^{11}$ |
| 2 | 10.8 | 0.5 | 5.2 | 6.7 | 11.7 | 4.7 | 164 | $8.6 \times 10^{10}$ |
| 3 | 11.0 | 0.2 | 5.4 | 7.0 | 11.9 | 4.9 | 166 | $5.0 \times 10^{10}$ |
| 4 | 14.8 | 0.2 | 6.7 | 8.7 | 13.2 | 6.6 | 162 | $8.8 \times 10^{10}$ |
| 5 | 13.2 | 0.3 | 5.3 | 6.9 | 11.8 | 4.8 | 162 | $9.2 \times 10^{10}$ |

Example 4

To the crystallizer 1, the raw material solution was supplied constantly at a rate of 110 kg/hr by the raw material solution supply line L1, and at the same time, a mixed gas of carbon dioxide at a concentration of from 40 to 43%/air was continuously supplied by the carbon dioxide supply line L2 at a flow rate of 54 m$^3$/hr (standard state).

Further, from the inner cylinder 2 in the crystallizer 1, the slurry was withdrawn at a rate of 800 kg/hr by the slurry withdrawing line L3 into the dissolution apparatus 7, and returned to the atmospheric pressure. Air was passed through the membrane filter 11 of 0.1 μm and then blown from the air blowing line L7 at is a rate of 120 liter/hr (standard state), and then, this liquid was returned to the inlet (the upper side) of the inner cylinder 2 via the heat exchanger 10 (temperature: 67° C.) by the slurry recycling line L5. At that time, to the dissolution apparatus 7, an aqueous sodium hydroxide solution was supplied constantly at a rate of 12.5 kg/hr. The aqueous sodium hydroxide solution was one obtained by concentrating an aqueous sodium hydroxide solution Example 5

To the crystallizer 1, the raw material solution was supplied constantly at a rate of 180 kg/hr by the raw material solution supply line L1, and at the same time, a mixed gas of carbon dioxide at a concentration of from 40 to 43%/air was continuously supplied by the carbon dioxide supply line L2 at a flow rate of 72 m$^3$/hr (standard state).

Further, from the inner cylinder 2 in the crystallizer 1, the slurry was withdrawn at a rate of 800 kg/hr by the slurry withdrawing line L3 into the dissolution apparatus 7, and returned to the atmospheric pressure. Air was passed through a membrane filter of 0.1 μm and then blown from the air blowing line L7 at a is rate of 120 liter/hr (standard state), and then, this liquid was returned to the inlet (the upper side) of the inner cylinder 2 via the heat exchanger 10 (temperature: 67° C.) by the slurry recycling line L5. At that time, to the dissolution apparatus 7, pure water was supplied constantly at a rate of 20 kg/hr. The amount of the slurry withdrawn from the crystallizer 1 by the slurry withdrawing line L6 was adjusted depending upon the amount of the raw material solution supplied to maintain the liquid level in the crystallizer 1 to be constant. The crystallization temperature in the crystallizer 1 was maintained to be 65° C. by indirect heating by steam from the heat exchanger 10.

The compositions of the raw material solution supplied, the mother liquor in the crystallizer 1 and the mother liquor in the dissolution apparatus 7, as well as the average particle size of sodium hydrogencarbonate crystals in the crystallizer 1 and the apparent number of nuclei formed, from the first day to the fifth day after initiation of the crystallizing test, are shown in Table 5.

TABLE 5

| Number of days passed | Composition of the solution (mass %) | | | | | | Average particle size (μm) | Apparent number of nuclei formed (number) |
|---|---|---|---|---|---|---|---|---|
| | Raw material solution | | Mother liquor in the crystallizer | | Mother liquor in the dissolution apparatus | | | |
| | $Na_2CO_3$ | $NaHCO_3$ | $Na_2CO_3$ | $NaHCO_3$ | $Na_2CO_3$ | $NaHCO_3$ | | |
| 1 | 24.3 | 0.8 | 4.5 | 8.7 | 4.5 | 9.7 | 125 | $1.7 \times 10^{12}$ |
| 2 | 24.0 | 0.7 | 4.5 | 9.1 | 4.5 | 10.1 | 163 | $1.1 \times 10^{11}$ |
| 3 | 24.2 | 0.4 | 4.4 | 8.5 | 4.4 | 9.5 | 152 | $2.1 \times 10^{11}$ |
| 4 | 24.6 | 0.7 | 4.7 | 9.5 | 4.7 | 10.5 | 155 | $1.8 \times 10^{11}$ |
| 5 | 24.7 | 0.6 | 4.7 | 8.7 | 4.7 | 9.7 | 145 | $3.5 \times 10^{11}$ |

Example 6

To the crystallizer 1, the raw material solution was supplied constantly at a rate of 200 kg/hr by the raw material solution supply line L1, and at the same time, a mixed gas of carbon dioxide at a concentration of from 40 to 43%/air was continuously supplied by the carbon dioxide supply line L2 at a flow rate of 72 m³/hr (standard state).

Further, from the inner cylinder 2 in the crystallizer 1, the slurry was withdrawn at a rate of 800 kg/hr by the slurry withdrawing line L3 into the dissolution apparatus 7. Air was passed through a membrane filter of 0.1 μm and then blown from the air blowing line L7 at a rate of 120 liter/hr (standard state), and then, this liquid was returned to the inlet (the upper side) of the inner cylinder 2 via the heat exchanger 10 (temperature: 82° C.) by the slurry recycling line L5. The amount of the slurry withdrawn from the crystallizer 1 by the slurry withdrawing line L6 was adjusted depending upon the amount of the raw material solution supplied to maintain the liquid level in the crystallizer 1 to be constant. The crystallization temperature in the crystallizer 1 was maintained to be 80° C. by indirect heating by steam from the heat exchanger 10.

The compositions of the raw material solution supplied and the mother liquor in the dissolution apparatus 7, as well as the average particle size of sodium hydrogencarbonate crystals in the crystallizer 1 and the apparent number of nuclei formed, from the first day to the fifth day after initiation of the crystallizing test, are shown in Table 6.

TABLE 6

| Number of days passed | Composition of the solution (mass %) | | | | Average particle size (μm) | Apparent number of nuclei formed (number) |
|---|---|---|---|---|---|---|
| | Raw material solution | | Mother liquor in the dissolution apparatus | | | |
| | $Na_2CO_3$ | $NaHCO_3$ | $Na_2CO_3$ | $NaHCO_3$ | | |
| 1 | 21.0 | 2.2 | 4.3 | 12.3 | 170 | $6.2 \times 10^{10}$ |
| 2 | 21.2 | 2.2 | 4.1 | 12.3 | 172 | $7.1 \times 10^{10}$ |
| 3 | 20.4 | 2.0 | 4.2 | 12.0 | 163 | $5.0 \times 10^{10}$ |
| 4 | 19.8 | 2.3 | 4.1 | 11.7 | 162 | $8.2 \times 10^{10}$ |
| 5 | 20.0 | 2.4 | 4.2 | 11.5 | 162 | $1.0 \times 10^{10}$ |

Example 7

While a crystallization operation was carried out under the same conditions as in Example 3, from the third day after initiation of the crystallization, an operation was carried out wherein at the same time as the crystallization operation, the slurry was taken out from the lower portion of the dissolution apparatus 7 via a piping, and the slurry was returned to the dissolution apparatus 7 by using a wet system pulverizer manufactured by EUROTEC, LTD (CAVITRON CD1000) equipped with a motor with an output of 2.2 kW. By this operation, the crystal particles in the slurry withdrawn, were roughly pulverized. Here, an inverter was installed on the wet system pulverizer, and the rotational speed was adjusted while the crystal shape was observed. By this operation, crystals having the same width as in Example 3 and a length being short were obtained. The results of the crystallization in the same manner as in Example 1 are shown in Table 7.

TABLE 7

| Number of days passed | Composition of the solution (mass %) | | | | Average particle size (μm) | Apparent number of nuclei formed (number) |
|---|---|---|---|---|---|---|
| | Raw material solution | | Mother liquor in the dissolution apparatus | | | |
| | $Na_2CO_3$ | $NaHCO_3$ | $Na_2CO_3$ | $NaHCO_3$ | | |
| 1 | 19.9 | 1.2 | 7.2 | 11.7 | 175 | $9.0 \times 10^{10}$ |
| 2 | 19.7 | 0.8 | 7.2 | 12.1 | 182 | $3.2 \times 10^{10}$ |
| 3 | 19.5 | 1.1 | 7.4 | 11.5 | 199 | $2.6 \times 10^{10}$ |
| 4 | 19.5 | 1.3 | 7.4 | 13.0 | 202 | $1.2 \times 10^{10}$ |
| 5 | 19.3 | 1.1 | 7.1 | 12.0 | 198 | $1.6 \times 10^{10}$ |

Crystals (crystals A) obtained on the fifth day after initiation of the crystallization and crystals (crystals B) obtained on the second day after initiation of the crystallization were observed by a microscope and compared, whereby the length of the long axis of crystals A was shorter than crystals B, but the length of the short axis i.e. the thickness was substantially the same as the thickness of the short axis of crystals B, and thus, it was confirmed that the aspect ratio became small.

Example 8

The slurry withdrawing line L4 was employed instead of the slurry withdrawing line L3 in the transfer of the slurry from the crystallizer 1 to the dissolution apparatus 7. Other conditions were the same as in Example 2.

The compositions of the raw material solution supplied, the mother liquor in the crystallizer 1 and the mother liquor in the dissolution apparatus 7, as well as the average particle size of sodium hydrogencarbonate crystals in the crystallizer 1 and the apparent number of nuclei formed, from the first day to the fifth day after initiation of the crystallizing test, are shown in Table 6.

TABLE 8

| Number of days passed | Composition of the solution (mass %) | | | | | | Average particle size (μm) | Apparent number of nuclei formed (number) |
|---|---|---|---|---|---|---|---|---|
| | Raw material solution | | Mother liquor in the crystallizer | | Mother liquor in the dissolution apparatus | | | |
| | Na$_2$CO$_3$ | NaHCO$_3$ | Na$_2$CO$_3$ | NaHCO$_3$ | Na$_2$CO$_3$ | NaHCO$_3$ | | |
| 1 | 21.2 | 1.5 | 7.0 | 11.5 | 7.1 | 11.5 | 210 | 8.6 × 10$^9$ |
| 2 | 20.8 | 1.6 | 7.1 | 12.2 | 7.2 | 12.1 | 222 | 6.3 × 10$^9$ |
| 3 | 20.7 | 1.5 | 7.0 | 11.1 | 7.1 | 11.0 | 255 | 4.9 × 10$^9$ |
| 4 | 21.0 | 1.7 | 6.9 | 12.3 | 7.0 | 12.3 | 261 | 3.3 × 10$^9$ |
| 5 | 21.1 | 1.4 | 7.2 | 12.4 | 7.3 | 12.3 | 256 | 4.0 × 10$^9$ |

INDUSTRIAL APPLICABILITY

The alkali metal hydrogencarbonate having a high density and good solubility, obtainable by the present invention, is very useful for applications to e.g. sodium hydrogencarbonate for a dialytic agent to be used for e.g. hemodialysis by an artificial kidney, or sodium hydrogencarbonate for a bath agent.

What is claimed is:

1. A process for producing an alkali metal hydrogencarbonate, the process comprising
   reacting an aqueous solution containing alkali metal ions with carbon dioxide in a prescribed crystallizer to precipitate crystals of an alkali metal hydrogencarbonate,
   withdrawing a part of a slurry containing the above crystals in the above aqueous solution (mother liquor) from the above crystallizer and,
   after a part of the above crystals is dissolved, directly returning the dissolved crystals and the mother liquor without separating the crystals and mother liquor to the above crystallizer.

2. The process for producing an alkali metal hydrogencarbonate according to claim 1, wherein the part of the above crystals contained in the slurry is dissolved by adjusting the pressure of the above slurry withdrawn from the above crystallizer to be lower than the pressure in the above crystallizer.

3. The process for producing an alkali metal hydrogencarbonate according to claim 1, wherein the part of the above crystals contained in the slurry is dissolved by blowing air into the above slurry withdrawn from the above crystallizer, in a volume of from 0.2 to 20 times in a standard state relative to the flow rate of the slurry.

4. The process for producing an alkali metal hydrogencarbonate according to claim 1, wherein the part of the above crystals contained in the slurry is dissolved by adding an aqueous solution containing a carbonate and/or hydroxide of an alkali metal, to the above slurry withdrawn from the above crystallizer.

5. The process for producing an alkali metal hydrogencarbonate according to claim 1, wherein the part of the above crystals contained in the slurry is dissolved by adding water to the above slurry withdrawn from the above crystallizer.

6. The process for producing an alkali metal hydrogencarbonate according to claim 1, wherein the part of the above crystals contained in the slurry is dissolved by heating the slurry withdrawn from the above crystallizer.

7. The process for producing an alkali metal hydrogencarbonate according to claim 1, wherein the amount of the above slurry withdrawn from the above crystallizer is from 30 to 200 mass % per one hour, based on the total amount of the slurry in the above crystallizer.

8. The process for producing an alkali metal hydrogencarbonate according to claim 1, wherein the above aqueous solution contains a carbonate and/or hydroxide of an alkali metal.

9. The process for producing an alkali metal hydrogencarbonate according to claim 1, wherein the above alkali metal is sodium or potassium.

10. The process for producing an alkali metal hydrogencarbonate according to claim 1, wherein all or a part of the crystals contained in the above slurry withdrawn from the above crystallizer is pulverized.

11. The process for producing an alkali metal hydrogencarbonate according to claim 1, wherein the composition of the mother liquor of the above slurry withdrawn from the above crystallizer, is such that the alkali metal hydrogencarbonate is at a concentration of less than the saturated concentration.

12. The process for producing an alkali metal hydrogencarbonate according to claim 1, wherein the temperature in the above crystallizer is from 50 to 90° C.

* * * * *